(12) United States Patent
Salama

(10) Patent No.: US 7,120,682 B1
(45) Date of Patent: Oct. 10, 2006

(54) VIRTUAL PRIVATE NETWORKS FOR VOICE OVER NETWORKS APPLICATIONS

(75) Inventor: Hussein Farouk Salama, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 901 days.

(21) Appl. No.: 09/802,716

(22) Filed: Mar. 8, 2001

(51) Int. Cl.
- *G06F 15/177* (2006.01)
- *G06F 15/16* (2006.01)
- *G06F 7/00* (2006.01)
- *H04L 12/66* (2006.01)

(52) U.S. Cl. ............... 709/222; 707/1; 709/238; 709/249; 370/352; 370/401; 379/900

(58) Field of Classification Search ......... 709/231, 709/238, 222, 249; 370/352, 401; 379/900; 707/1
See application file for complete search history.

(56) References Cited

U.S. PATENT DOCUMENTS

| | | | |
|---|---|---|---|
| 6,278,707 B1* | 8/2001 | MacMillan et al. | 370/352 |
| 6,529,499 B1* | 3/2003 | Doshi et al. | 370/352 |
| 6,584,093 B1* | 6/2003 | Salama et al. | 370/351 |
| 6,741,585 B1* | 5/2004 | Munoz et al. | 370/352 |
| 2002/0014282 A1* | 2/2002 | Andersson et al. | 148/276 |
| 2002/0027915 A1* | 3/2002 | Foti et al. | 370/392 |
| 2002/0075844 A1* | 6/2002 | Hagen | 370/351 |
| 2002/0112073 A1* | 8/2002 | MeLampy et al. | 709/240 |
| 2002/0145975 A1* | 10/2002 | MeLampy et al. | 370/235 |
| 2002/0169887 A1* | 11/2002 | MeLampy et al. | 709/231 |

OTHER PUBLICATIONS

Rosenberg, J. and Schulzrinne, H. "Request for Comments (RFC) 2871: A Framework for Telephony Routing over IP", Jun. 2000, 25 pages.*

Rosenberg, J. et al. "Telephony Routing over IP(TRIP)", published by IPTEL Working Group, Internet Draft, Version 01, 60 pages.*

Rosenberg, J. et al. "A Framework for Telephony Routing over IP", published by Network Working Group, Jun. 2000, 25 pages.*

IPTEL Working Group. "IPTEL Minutes at ITEF 48", Jul. 2000, Pittsburgh, PA, 15 pages.*

* cited by examiner

Primary Examiner—David Wiley
Assistant Examiner—George C. Neurauter, Jr.

(57) ABSTRACT

A method for providing virtual private networks for voice over data network users. A location server is provided that has more than one routing information database. A virtual private network is defined within that location server for each of the routing information databases. As registration information from gateways is received, they are associated with the appropriate virtual private network.

13 Claims, 2 Drawing Sheets

VIRTUAL PRIVATE NETWORKS FOR VOICE OVER NETWORKS APPLICATIONS

BACKGROUND

1. Field

This disclosure relates to voice applications over data networks, more particularly to providing virtual private network services for voice applications over data networks.

2. Background

Data networks have given rise to many alternatives to traditional phone service. Enterprises of all kinds can use the capacity of their intra-enterprise data network to route packets of all kinds of data, such as voice and video. Voice over data networks have rapidly developed. The data network may follow one of many standardized protocols for establishing connections between nodes on the network to pass packets between end users. These include Internet Protocol (IP), Frame Relay (FR), Asynchronous Transfer Mode (ATM), among others. Voice over these networks is referred to typically as Voice-over-IP, Voice-over-FR, or Voice-over-ATM. Generally, these will all be referred to as Voice-over-X, or VoX. One of the features offered in the telephone realm is that of a virtual private network (VPN). In regard to telephones, a VPN allows a private network to be set up and administered over public wires in the public switched telephone network (PSTN). Recently, some network providers have begun offering VPNs for data networks. Using a VPN from a network provider allows the enterprise to have a secure, authorized-user only data network without having to buy, administer and maintain all of the equipment necessary for a truly private network. The enterprise need only have servers that allow their users to connect to the network provider servers.

However, the VoX area is one in which VPNs are not currently being offered. Generally, these VoX networks require interfaces to the PSTN, as well as specialized equipment to enable VoX calls. Many end users that may be recipients of a VoX call will use standard telephones, hence the requirement that the VoX network interface with PSTN equipment. Currently, no solution to the problem of offering virtual private network services for voice applications over data networks has been identified.

SUMMARY

One aspect of the disclosure is a method for providing virtual private networks for voice over data network users. A location server is provided that has more than one routing information database. A virtual private network is defined within that location server for each of the routing information databases. As registration information from gateways is received, they are associated with the appropriate virtual private network. An identifier is assigned to each virtual private network and passed between location servers to ensure the correct routing information for each virtual private network is synchronized between the location servers.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
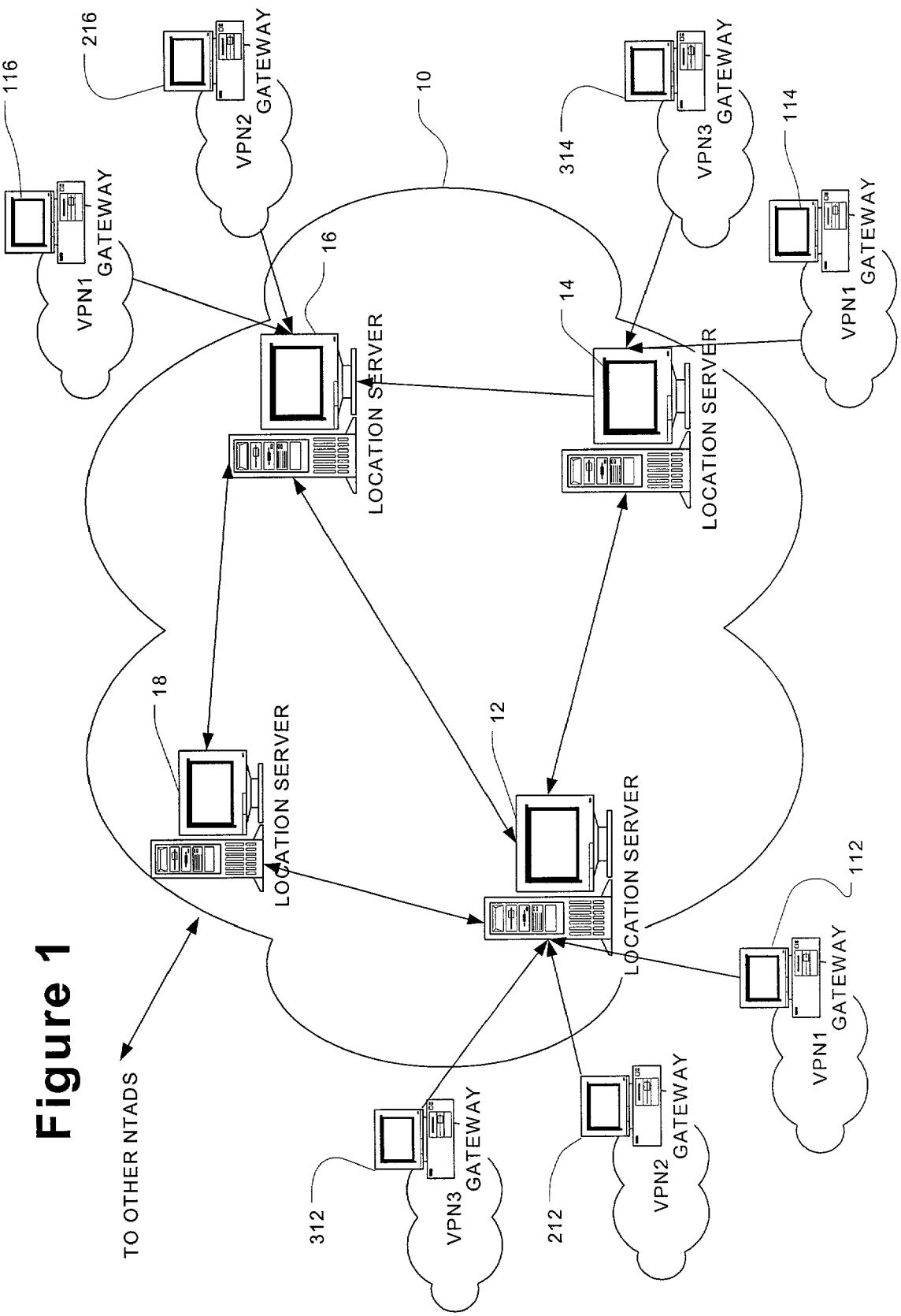
FIG. 1 shows one embodiment of a network telephony administrative domain, in accordance with the invention.

FIG. 1 shows one embodiment of a network telephony administrative domain (NTAD). In order to provide a familiar context within which the invention can be understood, terminology similar to that used for Internet Protocol (IP) telephony administrative domains (ITADs) may be used. However, there is no intention of limiting the application of the invention to IP applications. IP terminology seems to be the most pervasive and merely provides a framework within which the concepts of the invention can be most clearly explained.

An NTAD such as 10 of FIG. 1 is a collection of resources under the control of a single administrative authority. As an example, a network service provider may be the administrative authority on a given NTAD. The NTAD may have several location servers within it, such as those shown in FIG. 1 at 12, 14, 16 and 18. The term location server as used here designates a server that maintains and exchanges information with regards to the network, such as reachability information, routes, identification of gateways for destinations residing in the PSTN, etc. These location servers allow the system to operate more efficiently and to avoid routing loops, and can enforce policies for a particular route or customer.

Each location server exchanges information with other location servers so that they remain synchronized. This can be accomplished in several ways. During the initialization of a peer-to-peer connection between two location servers, they may do a complete exchange of their databases, ensuring that both of them have the same information. As new gateways are linked to any given location server, or any information comes to one location server that affects the peer server, that information may be sent as an incremental update. The term 'gateway' as used here is slightly different than that used in most contexts. A gateway, as used here, is any component at a customer site that communicates with the network service provider location server that provides the VPN service. This will be discussed in more detail further.

Currently, most protocols and standards track the new members of the NTAD and the routing information in routing information databases. One such protocol is the Telephony Routing over Internet Protocol (TRIP), set out by the Internet Engineering Task Force. Another is the Border Gateway Protocol used to distribute routing information between administrative domains. However, TRIP is specific to IP telephony and BGP is directed to routing information on data networks in general.

TRIP does not have the capability to provide virtual private networks for voice over data networks. The routing information databases in TRIP are referred to as routing information bases (RIBs). TRIP only considers a single RIB per location server. The RIB includes all routes learned from the other peers. There is no way to implement a virtual private network in this type of situation. There is no way for a location server to associate different external peers with different virtual private networks and to maintain separate RIBs for each VPN. This can be seen from the following example.

If a network service provider provided TRIP services to several different enterprises, there is no way to isolate one enterprise from another. Routes from different enterprises will be inserted into the same RIB. All of the location servers would have the same RIB, so all of the location servers would manage one large network, instead of several private networks, one for each enterprise. In order for each enterprise to have its own network, it would either have to maintain a proprietary network internally, or ask the network provider to configure a separate network with separate equipment. For apparent reasons, this is impractical for the network provider, so the enterprise must bring their private network internal.

However, if several segregated routing information databases could be maintained, several virtual private networks can be maintained within one NTAD. Each routing information database can be associated with a different virtual private network. The location servers can be configured to insert all routes received from a specific external peer to a specific routing information database. For the example of TRIP above, there would be several RIBs on each location server.

In order for the location server to maintain several routing information databases, however, some way to differentiate the information destined for each database would have to be provided. One method to allow differentiation would assign a VPN identification (VPNID). The VPNID would allow the location server to identify into which routing information database the information is to go.

The external peers are those resources that are outside the administrative domain, but have information required by the NTAD. Examples of these could be servers in other NTADs, or gateways located at or administrated by the enterprise. In FIG. 1, for example, the gateways 112, 212 and 312 are external peers to the location server 12. Similarly, location server 14 has external peers 114 and 314, and location server 16 has external peers 116 and 216.

As discussed above, these gateways communicate with the service provider location servers. They could be SIP (session initiation protocol) proxy servers connecting IP phones, a H.323 (the standards governing audiovisual conferencing over IP) gatekeeper managing IP phones, a PBX (private branch exchange) with data network interface managing traditional phones, or even a IP/PSTN gateway connecting the traditional phones at a customer site, as examples. Generally, the gateway advertises the reachability of destinations in the customer site to the service provider location server and queries the service provider location server for routing information outside the customer's local site. These functions could be contained in one piece of hardware or may reside in two different physical elements.

As can be seen in FIG. 1, the NTAD 10 has three different VPNs shown. Each of the location servers would then maintain three different routing information databases, one for each VPN. It should be noted that the determination of the gateway's VPN is done by the system designation of the gateway, not by the connection between the location server and the gateways. For example, location server 12 has three external peers, but each external peer is part of a different VPN.

When the gateways initially join the NTAD, they transfer their reachability and other necessary information to the location server, including the VPN. When a customer gateway receives a call, it queries the location server as to the best route. The location server then determines the appropriate VPN based upon the VPNID assigned by the system to that gateway and looks at routes in the associated routing information database. The gateways themselves do not have to be aware of the VPNIDs, they are assigned by the location server from the NTAD.

In addition to offering the features associated with a private network to the customer, the network provider could also provide the customer the ability to call outside the VPN. One method for accomplishing this may include using a global routing information database and leaking information from the global routing information database into the routing information database of that customer.

The location server holds all of this information, segregated into VPNs. The global routing information database is updated every time an update is sent. Each individual routing information database is updated only when updates are received for the particular VPNID. An example of a location server is shown in FIG. 2.

Figure 2:
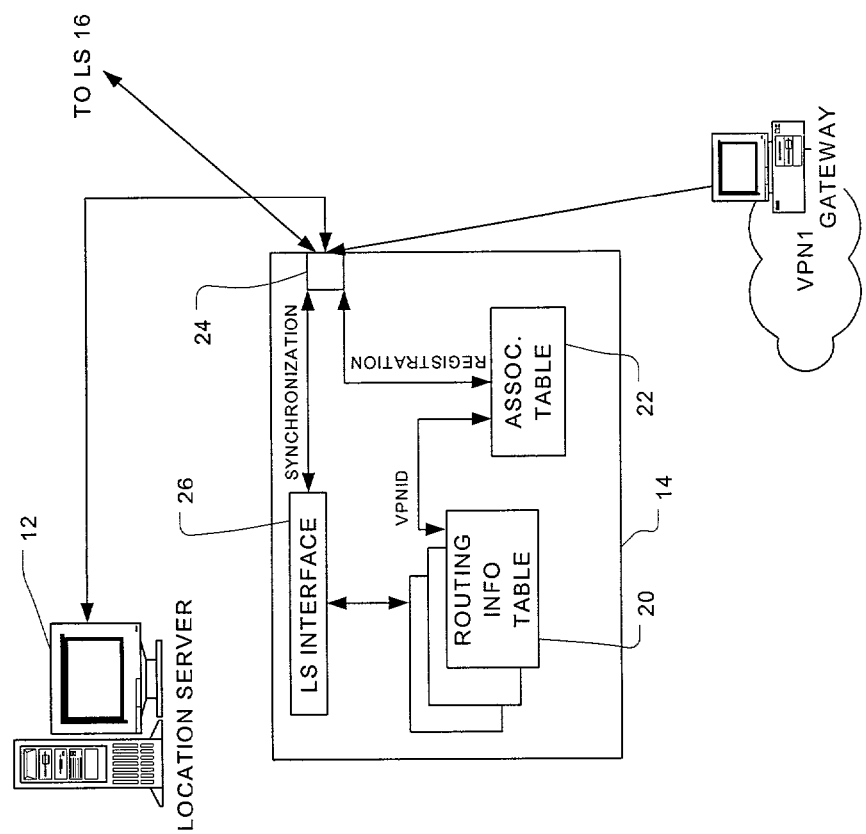
FIG. 2 shows a network device configured to serve as a location server.

The location server 14 from FIG. 1 is shown in more detail in FIG. 2. This could be any network device such as a server, router, multi-access controller, etc. Within the network device, there are at least two routing information databases 20, but more than likely there will be several. An association table identifies the appropriate routing information database for the gateway active on the port 24. These are just examples, and other methods of providing routing information for each gateway are also possible within the scope of the invention.

When the gateway 114 becomes active on the port 24, the appropriate routing information database is accessed when identified from the association table. This ensures that the gateway 114, a member of VPN 1, receives the routing information for VPN 1. The location server also has an interface 26 for communication with the other location servers. This is shown as being on the same port 24, for simplicity only. There may be a second port through which the location server 14 communicates with the other location servers, such as 12, shown, and 16, shown in FIG. 1.

The location servers will update each other as new gateways become active. For example, if a call is initiated through gateway 114 the location server 14 assigns the VPNID. This is then sent to the other location servers to let them know to what VPN the route being advertised belongs. This ensures the proper routing information database in each location server is used to route calls for that gateway. In this manner, enterprises can access a secure network without having to maintain and administrate the network itself.

Figure 3:
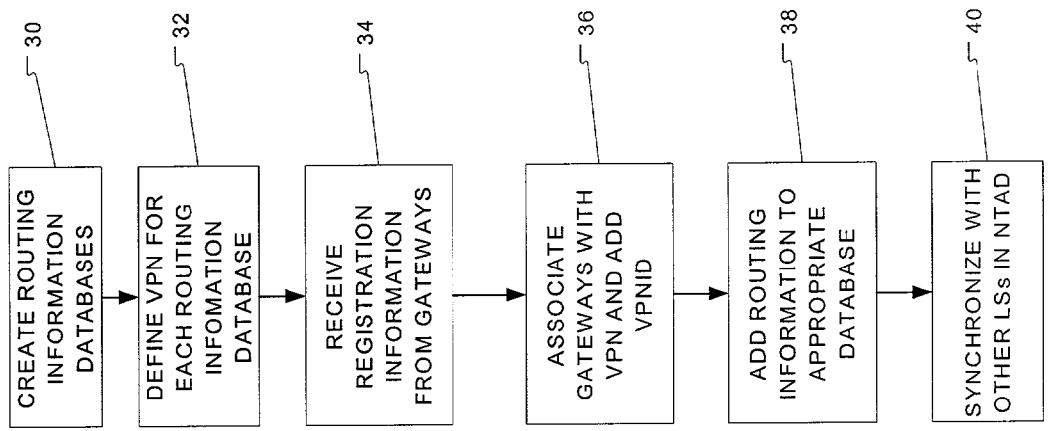
FIG. 3 shows a flowchart of one embodiment of a method of providing virtual private networks for voice over data networks, in accordance with the invention.

One embodiment of a process for providing virtual private networks for voice over network applications is shown in FIG. 3 in flowchart form. As mentioned above, a location server needs to be provided at 30, which may involve configuring a network device. Once a location server is provided, the VPN needs to be defined in the location server 32. This may involve populating the routing information database with the information from each member of the VPN. As gateways are initialized the location server receives the registration information from each gateway at 34 and associates it with the appropriate VPN and adds the appropriate VPNID as 36. The routing information is then added to the routing information database for that VPN at 38 and synchronizes with the other location servers at 40. This ensures that all of the information on all of the location servers is current.

Other processes are possible for setting up and initializing a virtual private network for voice over networks applications. The above is just intended as an example. Any process that results in several routing information databases, each associated with a VPN, being resident on a network device will achieve the desired result.

Typically, the configuration of location servers and establishing of databases and tables to define VPNs would be accomplished through software upgrades on network devices. The software upgrade would be distributed as an article containing software instructions, such as in a downloadable file. Once the file is downloaded into the network device, a series of instructions included on the downloadable file perform the methods of the invention. Other types of articles could include the instructions, such as processor in a new network device that has the instructions stored in memory.

Thus, although there has been described to this point a particular embodiment for a method and apparatus for providing virtual private networks for voice over networks applications, it is not intended that such specific references be considered as limitations upon the scope of this invention except in-so-far as set forth in the following claims.

What is claimed is:

1. A method for providing virtual private networks for voice over data network applications, the method comprising:
   creating at least two routing information databases on a location server;
   defining a voice virtual private network having a virtual private network identification such that each virtual private network corresponds to one of the routing information databases, wherein each routing information database maintains information for the virtual private network having a given virtual private network identification;
   receiving registration information from at least two gateways in communication with the location server, wherein the registration information allows identification of a virtual private network; and
   associating each gateway with one of the voice virtual private networks by associating each gateway with a virtual private network identification.

2. The method of claim 1, wherein the method further comprises assigning an identifier for each virtual private network.

3. The method of claim 1, wherein the method further comprises communicating the registration information to other location servers in the same network telephony administrative domain.

4. The method of claim 1, wherein the data network uses Internet Protocol.

5. The method of claim 4, wherein the routing information database is a telephony routing over IP routing information base.

6. The method of claim 1, wherein the method further comprises leaking a global routing information database to a routing information database for a particular virtual private network.

7. A network device, comprising:
   more than one routing information database wherein each routing information database is associated with a different virtual private network, the virtual private network identifiable by a virtual private network identification;
   at least one port operable to receive registration information from gateways in communication with the network device; and
   an association table operable to associate each routing information base with a different virtual private network and each gateway with a different routing information base.

8. The network device of claim 7, wherein the device further comprises an interface through which the device communicates with other devices having routing information databases to synchronize information contained in the routing information databases between the devices.

9. The network device of claim 7, wherein the device is a server.

10. The network device of claim 7, wherein the device is a router.

11. An article comprising a processor having instructions stored in memory that, when executed, result in:
   creation of at least two routing information databases on a network device;
   association of a different voice virtual private network with each routing information database such that each routing information database is associated with a different virtual private network by a virtual private network identification;
   reception of registration information from gateways in communication with the location server; and
   association of each gateway with one of the virtual private networks.

12. The article of claim 10, wherein the instructions further comprise a downloadable file.

13. A network device, comprising:
   means for providing more than one routing information base;
   means for defining a voice virtual private network such that each virtual private network corresponds to one of the routing information databases, wherein each routing information database is associated with a different virtual private network, the virtual private network identifiable by a virtual private network identification;
   means for receiving registration information from gateways in communication with the network device; and
   means for associating each gateway with one of the voice virtual private networks.

* * * * *